United States Patent [19]

Blom

[11] Patent Number: 4,919,908

[45] Date of Patent: Apr. 24, 1990

[54] CRYSTALLINE ALUMINOSILICATE AND A METHOD FOR ITS PREPARATION

[75] Inventor: Niels J. Blom, Hillerod, Denmark

[73] Assignee: Haldor Topsoe A/S, Denmark

[21] Appl. No.: 341,231

[22] Filed: Apr. 20, 1989

Related U.S. Application Data

[63] Continuation of Ser. No. 102,141, filed as PCT DK87/00004 on Jan. 20, 1987, published as WO87/04368 on Jul. 30, 1987, abandoned.

[30] Foreign Application Priority Data

Jan. 24, 1986 [DK] Denmark ............................. 374/86

[51] Int. Cl.$^5$ ............................................. B29C 53/00
[52] U.S. Cl. ..................................... 423/328; 423/329
[58] Field of Search ................... 423/320, 328, 328 M, 423/329

[56] References Cited

U.S. PATENT DOCUMENTS

| | | | |
|---|---|---|---|
| 3,252,757 | 5/1966 | Granquist | 502/80 X |
| 3,252,889 | 5/1966 | Capell | 502/212 X |
| 4,016,246 | 4/1977 | Whittam | 423/329 |
| 4,439,409 | 3/1984 | Duppe et al. | 502/60 |
| 4,474,741 | 10/1984 | Hoelderich et al. | 502/64 |
| 4,476,338 | 10/1984 | Chang et al. | 585/322 |
| 4,481,174 | 11/1984 | Baacke et al. | 423/306 |
| 4,578,258 | 3/1986 | Rieck | 423/328 C |
| 4,581,213 | 4/1986 | Rieck | 423/325 |
| 4,626,421 | 12/1986 | Zones | 423/326 |
| 4,632,815 | 12/1986 | Valyocsik | 423/329 |

Primary Examiner—Patrick P. Garvin
Assistant Examiner—George R. Fourson
Attorney, Agent, or Firm—Ostrolenk, Faber, Gerb & Soffen

[57] ABSTRACT

A synthetic, layered, crystalline aluminosilicate. The aluminosilicate has the general formula (expressed as moles of oxide ratios): $(M_{2/n}O)_x : (SiO_2)_y : (Al_2O_3)_z$ wherein M represents one or more n-valent cations selected from sodium, potassium and other cations capable of replacing sodium or potassium by ion-exchange. The ratio $y/z$ is between 15 and 300. The ratio $x/z$ is determined from the criterion of electron neutrality between anions and cations, and wherein the structural aluminum is tetrahedrally coordinated in the crystal lattice of the above formula. The aluminosilicates of the invention are used as catalysts for the preparation of higher hydrocarbons from raw material containing olefins or oxygenates. The aluminosilicates are prepared from a synthesis mixture comprising the following compounds and molar ratios: $SiO_2/Al_2O_3$: 5-500; $M_{2/n}O/SiO_2$: 0.1-10; $OH/SiO_2$: 0.1-5; and $H_2O/SiO_2$: 5-200. The synthesis mixture is maintained under autogenous pressure at a temperature of 80°-270° C. for four hours to 100 days.

13 Claims, No Drawings

CRYSTALLINE ALUMINOSILICATE AND A METHOD FOR ITS PREPARATION

This is a continuation of application Ser. No. 102,141 filed as PCT DK87/00004 on Jan. 20, 1987, published as WO87/04368 on Jul. 3, 1987, now abandoned.

FIELD OF THE INVENTION

The present invention relates to a synthetic layered crystalline aluminosilicate and a method for its preparation.

More specifically, the invention relates to a synthetic layered crystalline aluminosilicate having structural aluminum tetrahedrally coordinated in the crystalline framework, which exhibits useful properties as a catalyst.

DESCRIPTION OF THE PRIOR ART

Crystalline silicates comprise different classes of materials with varying chemical composition and structure.

One of the most well known classes is the zeolites which today are produced in large amounts and used for several different purposes, e.g. as adsorbents, for separation purposes, and as catalysts.

Another class which up to now has attained less interest comprises layered crystalline silicates. An example of a layered crystalline silicate is magadiite.

Magadiite is a layered crystalline sodium silicate which in the literature is described by the generally accepted formula $NaSi_7O_{13}(OH)_3 \cdot 3H_2O$. Natural magadiite, dependent on the place of origin, may contain aluminum as impurities, but not incorporated in the crystalline framework.

As an example, natural magadiite from Trinity County, Calif., has a content of aluminum of 0.15–0.18% by weight calculated as oxides (McAtee, J. L. et al., The American Mineralogist, Vol. 53, Nov.–Dec., 1968, pp. 2061-2069).

Preparation of synthetic magadiite has been described in the literature, e.g. in Iler, R. K., The Chemistry of Silica, p. 158, (1979).

Magadiite, either natural or synthetic, may be used for certain purposes, e.g. for ion-exchange or as a molecular sieve or as an absorbent (being able to swell). For catalytic applications, however, only modifications of magadiite have been described.

Catalysts consisting of or containing modified magadiite or other modified layered synthetic crystalline silicates are already known.

It is commonly known that catalysts having activity for certain reactions, e.g. conversion of $H_2/CO$ mixtures into hydrocarbons, may be prepared by incorporating catalytically active metals into a crystalline silicate. This can be performed by per se known methods, e.g. by ion-exchange and/or impregnation.

Some reactions are catalyzed by acidic sites in the catalyst. A typical example of such reactions is the conversion of oxygenates into hydrocarbons. This conversion is usually carried out using certain types of zeolites being synthetic crystalline aluminosilicates containing aluminum in the crystalline framework. It is known that the aluminum contained in the crystalline framework of the zeolites creates acidic sites being active for acid catalyzed reactions. Introduction of aluminum in the crystalline framework takes place during the synthesis of the zeolite, aluminum being present in the synthesis mixture. According to the above-mentioned known techniques, it is not possible to introduce aluminum in the crystalline framework of an already synthesized zeolite.

An example of a synthetic layered silicate is given in U.S. Pat. No. 4,481,174. This patent describes a process for the preparation of a synthetic aluminum and phosphorus containing crystalline layered alkali silicate designated PZ1. Furthermore, the patent describes how to transform PZ1 into a new crystalline aluminosilicate designated PZ2. PZ2 is stated to be suitable for catalytic conversion of alcohols into hydrocarbons. PZ1 is prepared from an aqueous synthesis mixture containing $SiO_2$, $Al_2O_3$, and alkali in the presence of an organic template compound containing phosphorus. It is stated that the synthesis must be performed using $SiO_2/Al_2O_3$ mole ratios of between 50 and about 250 since, otherwise, different products will be the result. PZ1 is, thereafter, transformed into PZ2 by treatment with a dilute acid or by ion-exchange with $NH_4Cl$ and subsequent calcination.

It is a characteristic feature of the aluminosilicates PZ1 and PZ2 that they both contain phosphorus. Furthermore, it is emphasized that the transformation of PZ1 to PZ2 is irreversible, i.e. PZ2 can not be transformed into PZ1 due to some structural changes. U.S. Pat. No. 4,481,174 states that PZ1 and PZ2 have distinctly different X-ray diffraction patterns which both are different from the X-ray diffraction pattern of magadiite.

SUMMARY OF THE INVENTION

The invention relates to a synthetic layered crystalline aluminosilicate having useful properties as a catalyst and a method for its preparation.

When disregarding the presence of crystal-water, the aluminosilicate of the invention can be characterized by the following general formula expressed as moles of oxides ratios:

$(M_{2/n}O)_x \cdot (SiO_2)_y \cdot (Al_2O_3)_z$

In this formula, M represents one or more n-valent cations selected from the group consisting of sodium, potassium, and any other cation capable of replacing sodium or potassium by ion-exchange. The ratio y/z is between 15 and 300, preferably between 20 and 150. The ratio x/z is determined from the criterion of electron neutrality between anions and cations. The major portion of aluminum is present tetrahedrally coordinated in the crystalline framework.

Furthermore, the invention relates to a method for the preparation of the above synthetic crystalline aluminosilicate. A characteristic feature of the method according to the present invention is that no template compound is used.

DETAILED DESCRIPTION OF THE INVENTION

It is known that crystalline aluminosilicates, e.g. zeolites, are active for shape selective reactions for instance conversion of methanol to higher hydrocarbons such as gasoline fractions. In particular, zeolites with a high silicon to aluminum ratio have shown high stability, whereas other zeolites often deactivate very rapidly.

It has surprisingly been found that the synthetic layered crystalline aluminosilicate of the present invention shows unusually high catalytic activity and selectivity for synthesis of higher hydrocarbons from a starting material comprising lower olefins or oxygenates. Furthermore, this aluminosilicate has a long active lifetime.

It is assumed that the tetrahedrally coordinated aluminum situated in the layered crystalline aluminosilicate framework is responsible for the catalytic activity. This assumption is supported by the fact that layered silicates containing no aluminum, for instance magadiite and layered silicates containing aluminum which is not incorporated in the crystalline framework do not have such catalytic activity.

The synthetic layered crystalline aluminosilicate according to the present invention can be characterized by its chemical composition, by its X-ray diffraction pattern, by its NMR spectrum, and by its alpha value.

The chemical composition as described by the above formula has been determined by conventional chemical analysis.

used. The peak heights, I, and the positions as a function of 2 times theta, where theta is the Bragg angle, were read from the diffractometer chart. From these, the relative intensities, $I/I_o$ (as per cent), where $I_o$ is the intensity of the strongest line or peak, and $d/Å$, the interplanar spacing in Å, corresponding to the recorded lines, were calculated. Only lines with $I/I_o \geq 1$ were taken into account.

In Table 1, the X-ray diffraction patterns are given of three typical synthetic layered crystalline aluminosilicates according to this invention and described later on in this specification, namely the aluminosilicates of Examples 1 and 2 and the aluminosilicate A of Example 3, all in their sodium form (Na-form). Table 1 further gives the X-ray diffraction pattern of natural magadiite and the X-ray diffraction pattern of PZ1 (as described in U.S. Pat. No. 4,481,174).

TABLE 1

| X-ray diffraction patterns of silicates on Na-form | | | | | | | | | |
|---|---|---|---|---|---|---|---|---|---|
| Aluminosilicates according to the invention | | | | | | Natural | | | |
| Example 1 | | Example 2 | | Example 3 | | Magadiite | | PZ1 | |
| $d/Å$ | $I/I_o$ | $d/Å$ | $I/I_o$ | $d/Å$ | $I/I_o$ | $d/Å$ | $I/I_o$ | $d/Å$ | $I/I_o$ |
| — | — | — | — | — | — | 19.4 | 10 | — | — |
| 15.2 | 100 | 15.4 | 100 | 15.3 | 100 | 15.5 | 100 | 15.49 | 100 |
| — | — | — | — | — | — | — | — | 9.97 | 7 |
| — | — | — | — | — | — | 9.83 | 2 | — | — |
| — | — | — | — | — | — | — | — | 9.18 | 1 |
| 7.68 | 8 | 7.73 | 7 | 7.67 | 6 | 7.76 | 3 | — | — |
| — | — | 7.31 | 2 | — | — | 7.20 | 2 | 7.31 | 2 |
| — | — | — | — | — | — | 6.83 | 1 | — | — |
| — | — | — | — | — | — | 5.60 | 2 | — | — |
| 5.14 | 8 | 5.16 | 10 | 5.13 | 12 | 5.17 | 10 | 5.15 | 17 |
| — | — | — | — | — | — | 5.01 | 9 | — | — |
| — | — | — | — | — | — | — | — | 4.84 | 13 |
| — | — | — | — | — | — | 4.69 | 3 | — | — |
| — | — | — | — | — | — | 4.45 | 14 | 4.55 | 7 |
| — | — | — | — | 4.23 | 2 | 4.24 | 2 | 4.23 | 5 |
| — | — | — | — | — | — | 4.00 | 7 | — | — |
| — | — | — | — | — | — | 3.92 | 5 | — | — |
| 3.85 | 5 | — | — | — | — | 3.85 | 2 | — | — |
| 3.73 | 3 | — | — | — | — | — | — | — | — |
| 3.64 | 21 | 3.64 | 15 | 3.65 | 16 | 3.62 | 8 | 3.68 | 6 |
| 3.56 | 26 | 3.56 | 17 | 3.55 | 21 | 3.54 | 10 | 3.56 | 14 |
| 3.45 | 76 | 3.45 | 65 | 3.45 | 68 | 3.43 | 40 | 3.44 | 59 |
| 3.31 | 47 | 3.31 | 36 | 3.30 | 41 | 3.30 | 27 | 3.30 | 30 |
| — | — | — | — | — | — | 3.20 | 11 | — | — |
| 3.15 | 56 | 3.16 | 63 | 3.15 | 53 | 3.14 | 30 | 3.15 | 28 |
| — | — | — | — | — | — | 3.03 | 4 | — | — |
| — | — | — | — | — | — | 2.98 | 4 | — | — |
| 2.82 | 5 | 2.83 | 5 | 2.82 | 4 | 2.85 | 4 | — | — |
| — | — | — | — | — | — | 2.81 | 4 | — | — |
| — | — | — | — | — | — | 2.73 | 2 | — | — |
| 2.61 | 3 | 2.60 | 4 | 2.62 | 2 | 2.64 | 2 | — | — |
| 2.58 | 5 | — | — | 2.58 | 5 | 2.59 | 3 | — | — |
| — | — | — | — | — | — | 2.53 | 3 | — | — |
| — | — | — | — | — | — | 2.52 | 3 | — | — |
| — | — | — | — | — | — | 2.50 | 2 | — | — |
| 2.43 | 2 | — | — | — | — | 2.40 | 2 | — | — |
| 2.34 | 4 | 2.35 | 5 | 2.34 | 4 | 2.35 | 4 | — | — |
| 2.29 | 3 | 2.29 | 4 | 2.28 | 2 | 2.28 | 2 | — | — |
| — | — | — | — | — | — | 2.26 | 2 | — | — |
| — | — | — | — | — | — | — | — | 2.15 | 18 |
| — | — | — | — | — | — | 2.09 | 1 | — | — |
| — | — | — | — | — | — | 2.07 | 2 | — | — |
| — | — | — | — | — | — | 2.05 | 4 | — | — |
| — | — | — | — | — | — | 2.01 | 1 | — | — |
| 1.99 | 2 | 1.99 | 1 | — | — | 2.00 | 1 | — | — |
| — | — | — | — | — | — | 1.96 | 1 | — | — |
| 1.93 | 2 | 1.94 | 2 | 1.93 | 2 | 1.94 | 2 | — | — |
| — | — | — | — | — | — | 1.87 | 2 | — | — |
| 1.83 | 15 | 1.83 | 13 | 1.83 | 13 | 1.82 | 6 | 1.83 | 6 |
| 1.78 | 1 | 1.78 | 2 | 1.78 | 1 | 1.78 | 1 | — | — |

The X-ray diffraction pattern was determined by standard techniques. The radiation was the K-alpha doublet of copper, and a proportional counter diffractometer equipped with a strip chart pen recorder was In Table 2, the X-ray diffraction patterns are given for the same aluminosilicates and in the same manner as in Table 1, however, after having been converted to their hydrogen form (H-form) as described in the examples. Table 2 further gives the X-ray diffraction patterns of the H-form of natural magadiite and PZ2 (as described in U.S. Pat. No. 4.481.174).

TABLE 2

X-ray diffraction patterns of silicates on H-form

| Aluminosilicates according to the invention | | | | | | H-form of Natural Magadiite | | PZ2 | |
|---|---|---|---|---|---|---|---|---|---|
| Example 1 | | Example 2 | | Example 3 | | | | | |
| d/Å | $I/I_o$ | d/Å | $I/I_o$ | d/Å | $I/I_o$ | d/Å | $I/I_o$ | d/Å | $I/I_o$ |
| 12.1 | 30 | 12.5 | 17 | 11.6 | 32 | 11.3 | 16 | 13.48 | 100 |
| 7.27 | 5 | 7.29 | 4 | — | — | 7.15 | 2 | 7.34 | 24 |
| — | — | — | — | — | — | 5.58 | 6 | — | — |
| — | — | — | — | — | — | 5.33 | 2 | — | — |
| — | — | — | — | — | — | 4.09 | 7 | — | — |
| 3.81 | 5 | — | — | 3.82 | 17 | — | — | — | — |
| 3.63 | 14 | 3.66 | 11 | 3.60 | 28 | 3.64 | 11 | — | — |
| — | — | — | — | — | — | 3.56 | 14 | 3.55 | 55 |
| 3.37 | 100 | 3.41 | 100 | 3.39 | 100 | 3.38 | 100 | 3.40 | 85 |
| 3.17 | 3 | 3.18 | 3 | — | — | 3.18 | 13 | — | — |
| — | — | — | — | — | — | 3.09 | 8 | — | — |
| — | — | 2.65 | 1 | — | — | 2.65 | 1 | — | — |
| — | — | 2.46 | 1 | — | — | 2.51 | 2 | — | — |
| — | — | — | — | — | — | 2.29 | 2 | — | — |
| — | — | 2.22 | 1 | — | — | 2.21 | 3 | — | — |
| — | — | — | — | — | — | 2.13 | 3 | — | — |
| — | — | — | — | — | — | 2.04 | 1 | — | — |
| — | — | — | — | — | — | 2.03 | 1 | — | — |
| — | — | — | — | — | — | 1.93 | 1 | — | — |
| 1.85 | 8 | 1.85 | 10 | 1.84 | 7 | 1.84 | 8 | 1.85 | 20 |
| 1.79 | 1 | 1.80 | 1 | — | — | 1.80 | 3 | — | — |

Tables 1 and 2 demonstrate that the aluminosilicates according to this invention, both in their Na-form and in their H-form, have X-ray diffraction patterns distinctly different from those of the known silicates such as natural magadiite and the silicates PZ1 and PZ2 described in U.S. Pat. No. 4,481,174.

The differences in the X-ray diffraction patterns of the aluminosilicates of the present invention may be ascribed to differences in the composition of the synthesis mixture and in the preparation. The first line of the X-ray diffraction pattern (i.e. lines 15.2, 15.4, and 15.3 of Table 1 and lines 12.1, 12.5, and 11.6 of Table 2, respectively) represents the basal spacing and is a measure of the degree of swelling of the layered crystalline aluminosilicate. Thus, it will appear, i.a. from the below Example 3 (Products C, D, E, and G) that heating to an elevated temperature will reduce the basal spacing. This may be explained by a dehydration of the aluminosilicate taking place.

Even though there is some variation in the X-ray diffraction patterns of the layered crystalline aluminosilicates according to the invention, certain lines of the diffraction patterns are characteristic features of these aluminosilicates. These characteristic lines of the Na-form aluminosilicate of the present invention are shown in Table 3:

TABLE 3

Characteristic lines in the X-ray diffraction pattern of the Na-form aluminosilicate of the present invention

| d/Å | $I/I_o$ |
|---|---|
| 15.4 ± 0.2 | VS |
| 7.7 ± 0.1 | VW |
| 5.13 ± 0.05 | W |
| 3.64 ± 0.02 | W |
| 3.56 ± 0.01 | MW |
| 3.45 ± 0.01 | S |
| 3.31 ± 0.01 | M |
| 3.15 ± 0.01 | M |
| 2.82 ± 0.01 | VW |
| 2.58 ± 0.02 | VW |

TABLE 3-continued

Characteristic lines in the X-ray diffraction pattern of the Na-form aluminosilicate of the present invention

| d/Å | $I/I_o$ |
|---|---|
| 2.33 ± 0.02 | VW |
| 2.28 ± 0.02 | VW |
| 1.93 ± 0.01 | VW |
| 1.83 ± 0.01 | W |
| 1.78 ± 0.01 | VW |

The letters used in Table 3 to indicate the relative intensities have the following meanings:
VS = very strong
S = strong
M = moderate
MW = medium weak
W = weak
VW = very weak The position of aluminum in the crystalline framework work was determined by an NMR technique. $^{27}$Al and $^{29}$Si magic-angle spinning (MAS) solid state (SS) NMR abbreviated $^{27}$Al MAS-SS NMR respectively $^{29}$Si MAS-SS NMR was used. This NMR technique is described e.g. in Fyfe et al., J. Phys. Chem. 1984, 88, pp 3248–3253, and in Thomas, J. M. et al. ACS Symp. Ser. No. 1983, 218, pp. 159–180. The results of measurements by this technique are described in Example 1.

From the relative intensity of the NMR lines it is furthermore possible to calculate the $SiO_2/Al_2O_3$ ratio in the crystalline framework.

The catalytic activity of the aluminosilicates was evaluated by the so-called alpha test giving the alpha value.

The alpha value is an approximate indication of the catalytic cracking activity of a given catalyst compared to that of a standard catalyst, and it gives the relative rate constant expressed as the rate of normal hexane conversion per volume of catalyst per unit time. It is based on the activity of a highly active silica-alumina cracking catalyst taken as an alpha value of 1. The alpha value correlates with the number of acidic sites in the catalyst. The alpha test is described in the Journal of Catalysis, Vol. IV, pp. 522–529 (Aug. 1965), and in Nature 309, 589–591 (1984).

The synthetic layered crystalline aluminosilicate according to this invention is prepared from a synthesis mixture comprising at least one source of aluminum and at least one source of silicon, having the composition expressed as moles of oxides ratios:

|  | Broad Range | Preferred Range |
|---|---|---|
| $SiO_2/Al_2O_3 =$ | 5–500 | 10–300 |
| $M_{2/n}O/SiO_2 =$ | 0.01–10 | 0.1–2 |
| $OH/SiO_2 =$ | 0.1–5 | 0.2–4 |
| $H_2O/SiO_2 =$ | 5–200 | 5–75 | which is maintained under such conditions that crystallization of the synthetic layered crystalline aluminosilicate takes place.

It should be emphasized that no template compound or seeding is used in the preparation of the aluminosilicate according to the present invention.

It will be understood that each oxide component utilized in the synthesis mixture can be supplied by one or more initial reactants and that they can be mixed intimately together either at once or stepwise.

As a source of aluminum may be used one or more aluminum compounds, e.g. alumina hydrates and/or alkali metal aluminates, especially sodium aluminate.

As a source of silicon may be used one or more silicon compounds, e.g. silica, especially colloidal silica, and/or alkali metal silicates, especially sodium silicate.

The cation M may be added as a component of the above aluminates or silicates or as a separate component, e.g. as an alkali metal hydroxide, especially sodium hydroxide.

The concentration of water in the synthesis mixture is not critical. However, an increased concentration of water increases the preparation time, but on the other hand, reduces the risk of by-product formation.

Crystallization can be carried out at either static or stirred condition.

In the examples, static conditions were employed using polypropylene jars in stainless steel autoclaves at 130°–140° C. under autogeneous pressure. The pressure is not critical and can be varied within a wide range. The useful range of temperature is 80°–270° C. for about 4 hours to 100 days, preferably 95°–160° C. for about 10 hours to 30 days.

Crystal size and crystallization time of the synthetic layered crystalline aluminosilicate will vary with the nature of the reaction mixture employed and the crystallization conditions.

The preparation process shall be interrupted, when crystallization of the layered aluminosilicate is completed since, otherwise, unwanted by-products may be formed.

The synthetic layered crystalline aluminosilicate produced is preferably separated from the mother liquor by filtration and, thereafter, is preferably washed, suitably with deionized water at a temperature in the range of, for example, 15°–95° C.

The content of aluminum in the framework of the catalyst is closely related to the content of aluminum in the synthesis mixture. A high content of aluminum in the framework generally means a high catalytic activity.

On the other hand, a high content of aluminum in the synthesis mixture results in an increased crystallization time.

The synthetic layered crystalline aluminosilicates prepared by the method of this invention may be used as catalysts or as catalyst supports.

The synthetic layered crystalline aluminosilicates may be used as such or mixed with a support material such as silica, alumina, or another aluminosilicate.

Before use as a catalyst or a catalyst support, it is desirable to modify the synthetic layered crystalline aluminosilicate in one or a number of ways.

Thus, for many catalytic purposes, it is preferred to reduce the alkali metal content of the synthetic layered crystalline aluminosilicate. This may be achieved by subjecting the layered aluminosilicate to one or more ion-exchanges with a solution containing suitable cations.

For example, the aluminosilicates may be ion-exchanged with a solution containing ammonium cations and thereafter calcined to produce the active hydrogen-form.

Another way is ion-exchange with a solution of an acid, e.g. an aqueous mineral acid at a temperature in the range of 15°–95° C., preferably 20°–35° C. Furthermore, the layered aluminosilicates may be ion-exchanged or impregnated with a compound of one or more metals. Suitable metals include iron, cobalt, nickel, platinum, etc.

The compounds of the metals used are suitably those compounds which will decompose on the application of heat to form the corresponding oxides and which are soluble in water, e.g. the nitrates.

The synthetic layered crystalline aluminosilicate prepared, with or without the above described treatments and/or modifications, may be used as a catalyst in the form of a fixed or a fluidised bed in e.g. alkylation, oligomerisation, isomerisation, and hydrogenation reactions.

Especially, the synthetic layered crystalline aluminosilicate according to this invention may be used as a catalyst for conversion of alcohols and ethers to hydrocarbons.

In the following, the present invention will be further illustrated by way of examples which are intended to be solely exemplary of the invention.

Examples 1–5 show the preparation of preferred embodiments of the synthetic layered crystalline aluminosilicate according to the invention.

Example 6 shows that the reverse transformation of the H-form into the Na-form of the synthetic layered crystalline aluminosilicate according to Example 1, can be carried out using mild conditions.

Example 7 shows the preparation of an aluminosilicate with a composition different from that of the aluminosilicate of the present invention, i.e. an aluminosilicate having a molar $SiO_2/Al_2O_3$ ratio of 944.

Example 8 is a comparison example showing the catalytic activity for conversion of methanol into hydrocarbons of a synthetic layered crystalline aluminosilicate according to the present invention (the aluminosilicate of Example 1) compared to an aluminosilicate not included in the present invention (the aluminosilicate of Example 7). The Example further shows the composition of the produced hydrocarbon mixtures.

Example 9 shows the catalytic activity of a synthetic layered crystalline aluminosilicate according to the present invention (the aluminosilicate of Example 3) for conversion of olefins (exemplified by propylene) to hydrocarbon mixtures.

The sodium silicate solution employed in the examples has the following composition (% by weight):

| | |
|---|---|
| $SiO_2$ = | 27.8 |
| $Na_2O$ = | 8.2 |
| $H_2O$ = | 64.0 |

The colloidal silica employed in the examples has the following composition (% by weight):

| | |
|---|---|
| $SiO_2$ = | 40.0 |
| $Na_2O$ = | 0.5 |
| $H_2O$ = | 59.5 |

EXAMPLE 1

A solution of 20 g sodium aluminate in 250 g deionized water was added to 400 g sodium silicate solution while stirring at ambient temperature. To the mixture was added 400 g colloidal silica. The stirring was continued until an intimate mixture was obtained and then further 100 g colloidal silica was added.

The resulting synthesis mixture has the following molar composition:
$SiO_2/Al_2O_3$ = 54
$Na_2O/SiO_2$ = 0.14
$OH/SiO_2$ = 0.28
$H_2O/SiO_2$ = 8.6

The synthesis mixture was heated in an autoclave for 8 days at autogeneous pressure and at a temperature of 140° C.

The product was filtered off, washed by deionized water, and dried at ambient temperature.

A sample of the dried product was analysed using NMR. $^{27}Al$ MAS-SS NMR shows the presence of tetrahedrally coordinated aluminum characterized by a resonance at about 50 ppm referring to $Al(H_2O)_6^{3+}$. $^{29}Si$ MAS-SS NMR presents characteristic signals at about −111 and −106 ppm (relative to tetramethylsilane) referring to $Si(-OSi)_4$ and $Si(-OSi)_3(-OAl)$ groups, respectively.

The presence of the latter groups is indicative of tetrahedral aluminum incorporated in the silica framework.

The $SiO_2/Al_2O_3$ ratio calculated from the intensities of the $^{29}Si$ NMR lines at about −100 (=Si—O—R, R=Na, H), −106 and −111 ppm (se above) is 32.

The X-ray diffraction pattern of the product in its Na-form is shown in Table 4.

TABLE 4

| d/Å | $I/I_o$ |
|---|---|
| 15.20 | 100 |
| 7.68 | 8 |
| 5.14 | 8 |
| 3.85 | 5 |
| 3.73 | 3 |
| 3.64 | 21 |
| 3.56 | 26 |
| 3.45 | 76 |
| 3.31 | 47 |
| 3.15 | 56 |
| 2.82 | 5 |
| 2.61 | 3 |
| 2.58 | 5 |
| 2.43 | 2 |
| 2.34 | 4 |

TABLE 4-continued

| d/Å | $I/I_o$ |
|---|---|
| 2.29 | 3 |
| 2.00 | 2 |
| 1.93 | 2 |
| 1.83 | 15 |
| 1.78 | 1 |

The X-ray diffraction pattern showed that the Na-form product was crystalline.

A sample of the product was transferred into the H-form by ion-exchange using an aqueous 0.1N HCl solution, washing by deionized water, and drying at ambient temperature.

The X-ray diffraction pattern of the product in its H-form is shown in Table 5.

TABLE 5

| d/Å | $I/I_o$ |
|---|---|
| 12.1 | 30 |
| 7.27 | 5 |
| 3.81 | 5 |
| 3.63 | 14 |
| 3.37 | 100 |
| 3.17 | 3 |
| 1.85 | 8 |
| 1.79 | 1 |

The X-ray diffraction pattern showed that the H-form product was crystalline. The H-form product had an alpha value of 14.8.

EXAMPLE 2

A solution of 13,4 g sodium aluminate in 500 g deionized water was added to 800 g sodium silicate solution while stirring at ambient temperature. To the mixture was added 800 g colloidal silica. The stirring was continued until an intimate mixture was obtained.

The resulting synthesis mixture had the following molar composition:
$SiO_2/Al_2O_3$ = 140
$Na_2O/SiO_2$ = 0.13
$OH/SiO_2$ = 0.26
$H_2O/SiO_2$ = 9.15

The synthesis mixture was placed in an autoclave for 6 days at autogeneous pressure and at a temperature of 135° C.

The product was filtered off, washed by deionized water, and dried at ambient temperature.

The X-ray diffraction pattern of the product in its Na-form is shown in Table 6.

TABLE 6

| d/Å | $I/I_o$ |
|---|---|
| 15.4 | 100 |
| 7.73 | 7 |
| 7.31 | 2 |
| 5.16 | 10 |
| 3.64 | 15 |
| 3.56 | 17 |
| 3.45 | 65 |
| 3.31 | 36 |
| 3.16 | 63 |
| 2.83 | 5 |
| 2.60 | 4 |
| 2.35 | 5 |
| 2.29 | 4 |
| 1.99 | 1 |
| 1.94 | 2 |
| 1.83 | 13 |

TABLE 6-continued

| d/Å | I/I$_o$ |
|---|---|
| 1.78 | 2 |

The X-ray diffraction pattern showed that the Na-form product was crystalline.

Chemical analysis carried out on the crystalline product showed the following chemical composition (per cent by weight):
Na$_2$O=5.9
Al$_2$O$_3$=0.85
SiO$_2$=82.7
H$_2$O=10.6

Consequently, the molar SiO$_2$/Al$_2$O$_3$ ratio is 165.

A sample of the product was transferred into the H-form by ion-exchange using an aqueous 0.1N HCl solution, washing by deionized water, and drying at ambient temperature.

The X-ray diffraction pattern of the product in its H-form is shown in Table 7.

TABLE 7

| d/Å | I/I$_o$ |
|---|---|
| 12.5 | 17 |
| 7.29 | 4 |
| 3.66 | 11 |
| 3.41 | 100 |
| 3.18 | 3 |
| 2.65 | 1 |
| 2.46 | 1 |
| 2.22 | 1 |
| 1.85 | 10 |
| 1.80 | 1 |

The X-ray diffraction pattern showed that the H-form product was crystalline.

EXAMPLE 3

A solution of 40 g sodium aluminate in 500 g deionized water was added to 800 g sodium silicate solution while stirring at ambient temperature. To the mixture was added 1000 g colloidal silica. The stirring was continued until an intimate mixture was obtained.

The resulting synthesis mixture had the following molar composition:
SiO$_2$/Al$_2$O$_3$=54
Na$_2$O/SiO$_2$=0.14
OH/SiO$_2$=0.28
H$_2$O/SiO$_2$=8.6

The synthesis mixture was heated in an autoclave for 10 days at autogeneous pressure and at a temperature of 130° C.

The obtained product A was filtered off, washed by deionized water, and dried at ambient temperature.

A product B was obtained by heating a sample of A to 120° C. for 16 hours.

A product C was obtained by heating a sample of A to 480° C. for 4 hours.

The X-ray diffraction patterns of the three Na-form products A, B, and C are shown in Table 8.

TABLE 8

| A | | B | | C | |
|---|---|---|---|---|---|
| d/Å | I/I$_o$ | d/Å | I/I$_o$ | d/Å | I/I$_o$ |
| 15.3 | 100 | 15.2 | 100 | 12.5 | 15 |
| 7.67 | 6 | 7.60 | 6 | — | — |
| — | — | — | — | 7.22 | 3 |
| 5.13 | 12 | 5.09 | 7 | — | — |
| 4.23 | 2 | — | — | — | — |
| — | — | 3.83 | 5 | 3.80 | 3 |
| 3.65 | 16 | 3.64 | 18 | — | — |
| 3.55 | 21 | 3.55 | 22 | 3.58 | 17 |
| 3.45 | 68 | 3.44 | 67 | 3.38 | 100 |
| 3.30 | 41 | 3.30 | 42 | — | — |
| 3.15 | 53 | 3.15 | 49 | — | — |
| 2.82 | 4 | 2.81 | 3 | — | — |
| 2.62 | 2 | 2.62 | 3 | — | — |
| 2.58 | 5 | 2.57 | 3 | 2.55 | 2 |
| 2.34 | 4 | 2.33 | 3 | — | — |
| 2.28 | 2 | — | — | — | — |
| 1.93 | 2 | 1.93 | 2 | — | — |
| 1.83 | 13 | 1.83 | 13 | 1.84 | 9 |
| 1.78 | 1 | 1.78 | 2 | 1.78 | 1 |

The X-ray diffraction patterns showed that the products were crystalline.

A sample of the Na-form product A was transferred into the H-form product D by ion-exchange with an aqueous 2M NH$_4$NO$_3$ solution at 80° C., washing by deionized water and calcinating in air for 4 hours at 480° C.

Using the same treatment, a sample of the Na-form product C was transferred into the H-form product E.

A sample of the Na-form product A was transferred into the H-form product F by ion-exchange with an aqueous 0.1N HCl solution at 20° C., washing by deionized water and drying at ambient temperature.

A sample of the H-form product F was calcined at 530° C. for ½ hour leading to a H-form product G.

The X-ray diffraction patterns of the four H-form products D, E, F, and G are shown in Table 9.

TABLE 9

| D | | E | | F | | G | |
|---|---|---|---|---|---|---|---|
| d/Å | I/I$_o$ | d/Å | I/I$_o$ | d/Å | I/I$_o$ | d/Å | I/I$_o$ |
| 11.6 | 32 | 11.1 | 16 | 12.5 | 19 | 11.1 | 30 |
| — | — | — | — | 7.33 | 6 | 7.25 | 4 |
| — | — | — | — | — | — | 5.91 | 3 |
| — | — | — | — | — | — | 5.46 | 14 |
| 3.82 | 17 | 3.83 | 8 | — | — | 3.81 | 11 |
| 3.60 | 28 | — | — | 3.63 | 6 | 3.64 | 5 |
| 3.39 | 100 | 3.39 | 100 | 3.40 | 100 | 3.38 | 100 |
| — | — | — | — | 3.16 | 2 | — | — |
| — | — | — | — | — | — | 2.99 | 2 |
| — | — | — | — | 2.64 | 1 | — | — |
| — | — | — | — | 2.46 | 1 | — | — |
| — | — | — | — | 2.22 | 1 | — | — |
| 1.84 | 7 | 1.84 | 6 | 1.85 | 9 | 1.85 | 6 |
| — | — | — | — | 1.80 | 1 | — | — |

The X-ray diffraction patterns showed that the products were crystalline.

The H-form product D had an alpha value of 14.4.

Chemical analysis carried out on the Na-form product A showed the following chemical composition (per cent by weight):
Na$_2$O=5.4
Al$_2$O$_3$=4.0
SiO$_2$=64.4
H$_2$O=26.3

Consequently, the molar SiO$_2$/Al$_2$O$_3$ ratio is 27.4.

From NMR analysis carried out on the Na-form product A in the same way as described above, a SiO$_2$/Al$_2$O$_3$ ratio of 27.2 was calculated. This indicates that essentially all Al is present tetrahedrally coordinated in the crystalline framework.

EXAMPLES 4 and 5

Two synthesis mixtures were prepared as described in Example 1, the only difference being that the gel preparation was performed at 0° C.

The synthesis mixtures were placed in autoclaves for 6 days at autogeneous pressure and at a temperature of 130° C.

To the mixture was then added deionized water for adjustment to the following molar ratios:

|  | Ex 4 | Ex 5 |
|---|---|---|
| $H_2O/SiO_2$ | 28.5 | 135.0 |

Thereafter the mixtures were placed in autoclaves for further 10 days at the above conditions.

The products were filtered off, washed by deionized water, and dried at ambient temperature.

The X-ray diffraction patterns of the products in their Na-form are shown in Table 10.

TABLE 10

| Ex 4 | | Ex 5 | |
|---|---|---|---|
| d/Å | $I/I_o$ | d/Å | $I/I_o$ |
| 15.34 | 100 | 15.37 | 100 |
| 7.68 | 7 | 7.70 | 8 |
| 7.14 | 2 | — | — |
| 5.10 | 11 | 5.14 | 12 |
| 3.65 | 15 | 3.64 | 18 |
| 3.56 | 18 | 3.56 | 24 |
| 3.45 | 74 | 3.45 | 77 |
| 3.31 | 41 | 3.30 | 46 |
| 3.15 | 57 | 3.15 | 62 |
| 2.82 | 5 | 2.82 | 4 |
| 2.63 | 3 | 2.63 | 3 |
| 2.57 | 5 | 2.58 | 6 |
| — | — | 2.54 | 3 |
| 2.41 | 2 | 2.43 | 2 |
| 2.34 | 5 | 2.32 | 7 |
| 2.29 | 7 | 2.27 | 1 |
| — | — | 2.05 | 2 |
| 1.99 | 1 | 2.00 | 3 |
| 1.93 | 2 | 1.93 | 2 |
| 1.83 | 15 | 1.83 | 15 |
| 1.78 | 2 | 1.78 | 2 |

The X-ray diffraction patterns showed that the products were crystalline.

EXAMPLE 6

2 g of the H-form product prepared according to the above Example 1 was added to 100 ml 0.1M aqueous sodium carbonate solution. The mixture was stirred for 1 hour at ambient temperature. The ion-exchanged product, i.e. the Na-form product, was filtered off, washed by deionized water, and dried at ambient temperature.

The dried Na-form product was analyzed as described in the above Example 1. The X-ray diffraction pattern of the dried Na-form product was practically identical to that of the Na-form product according to Example 1.

These findings show that ion-exchange of the H-form into the Na-form can be carried out at mild conditions.

EXAMPLE 7

A solution of sodium aluminate in deionized water was added to 600 g sodium silicate solution and 600 g colloidal silica while stirring at 0° C. to obtain a synthesis mixture having the following molar composition:

$SiO_2/Al_2O_3 = 1000$
$Na_2O/SiO_2 = 0.12$
$OH/SiO_2 = 0.24$
$H_2O/SiO_2 = 7.3$

The synthesis mixture was heated in an autoclave for 5 days at autogeneous pressure and at a temperature of 130° C.

The product was filtered off, washed by deionized water, and dried at ambient temperature.

The X-ray diffraction pattern of the product in its Na-form is shown in Table 11.

TABLE 11

| d/Å | $I/I_o$ |
|---|---|
| 15.49 | 100 |
| 7.76 | 10 |
| 7.12 | 4 |
| 5.17 | 17 |
| 4.22 | 1 |
| 3.65 | 12 |
| 3.56 | 19 |
| 3.45 | 75 |
| 3.31 | 43 |
| 3.15 | 64 |
| 2.82 | 4 |
| 2.64 | 2 |
| 2.59 | 4 |
| 2.50 | 1 |
| 2.42 | 1 |
| 2.35 | 3 |
| 2.28 | 2 |
| 2.06 | 2 |
| 1.94 | 2 |
| 1.83 | 13 |
| 1.79 | 1 |

The X-ray diffraction pattern showed that the product was crystalline.

A sample of the crystalline product was shown by chemical analysis to have a molar $SiO_2/Al_2O_3$ ratio of 944.

The remaining part of the crystalline product was ion-exchanged into the H-form using an aqueous 0.1N HCl solution at ambient temperature, washed by deionized water and dried at ambient temperature.

The X-ray diffraction pattern of the product in its H-form is shown in Table 12.

TABLE 12

| d/Å | $I/I_o$ |
|---|---|
| 11.1 | 7 |
| 7.27 | 1 |
| 5.43 | 5 |
| 4.08 | 3 |
| 3.61 | 8 |
| 3.40 | 100 |
| 3.17 | 7 |
| 2.87 | 1 |
| 2.50 | 2 |
| 2.45 | 1 |
| 2.29 | 1 |
| 2.19 | 1 |
| 1.85 | 7 |
| 1.80 | 1 |

The X-ray diffraction pattern showed that the product was crystalline.

EXAMPLE 8

5 g of the Na-form product prepared according to Example 7 was added to a solution of 1.67 g Al(NO$_3$)$_3$.7H$_2$O in 20 g deionized water. The aqueous mixture was evaporated to dryness at 100° C. and the dry product was calcined for 2 hours at 400° C. to decompose the nitrate. Thereafter, the product was transferred into the H-form by ion-exchange with an aqueous 0.1N HCl solution, washing by deionized water and drying at ambient temperature.

The X-ray diffraction pattern of the H-form product is shown in Table 13.

TABLE 13

| d/Å | $I/I_o$ |
|---|---|
| 10.8 | 7 |
| 7.27 | 1 |
| 5.40 | 8 |
| 4.09 | 3 |
| 3.83 | 1 |
| 3.57 | 7 |
| 3.39 | 100 |
| 3.18 | 5 |
| 2.86 | 1 |
| 2.49 | 1 |
| 2.21 | 1 |
| 2.17 | 1 |
| 1.85 | 7 |
| 1.79 | 1 |

The X-ray diffraction pattern showed that the product was crystalline.

The molar $SiO_2/Al_2O_3$ ratio of the product was calculated to 30.8.

The product had an alpha value of 2.5.

EXAMPLE 9

Activity tests for methanol (MeOH) conversion into hydrocarbons (HC) were carried out on the H-form products of Examples 1 and 7 at the experimental conditions shown in Table 14.

TABLE 13

|  | H-form Product of Example 1 | H-form Product of Example 7 |
|---|---|---|
| T °C. | 380 | 374 |
| P | atmospheric | atmospheric |
| WHSV (MeOH) | 1.0 | 1.0 |
| Diluent | $N_2$ | $N_2$ |
| Hours on stream | 2 | 2 |
| Reactor | fixed bed | fixed bed |

The reaction products were analyzed using gas chromatography. The results are summarized in Table 15.

TABLE 15

|  | H-form Product of Example 1 | H-form Product of Example 7 |
|---|---|---|
| Conversion of MeOH to HC (wt %) | 45 | 2.1 |
| Product Analysis, wt % HC: |  |  |
| $CH_4$ | 5.8 | 6.3 |
| $C_2-$ | 0.7 | — |
| $C_2=$ | 9.1 | 35.7 |
| $C_3-$ | 2.0 | 10.3 |
| $C_3=$ | 20.2 | 19.2 |
| $iC_4-$ | 4.0 | — |
| $nC_4-$ | 1.2 | 13.7 |
| $C_4=$ | 14.1 | 14.7 |
| $C_5+$ | 43.1 | — |

The results clearly show the effect of the amount of aluminum in the crystalline framework with respect to catalytical activity and selectivity for formation of higher hydrocarbons.

EXAMPLE 10

An activity test for conversion of propylen was carried out using the H-form product A of Example 3 at the experimental conditions shown in Table 16.

TABLE 16

| T, °C. | 350 |
|---|---|
| P, bar | 8 |
| WHSV | 0.75 |
| Hours on stream | 120 |
| Reactor | fixed bed |

The products of the experiment were analysed using gas chromatography giving the results shown in Table 17.

TABLE 17

| Propylene conversion, wt % | 71 |
|---|---|
| Product analysis, wt %: |  |
| $C_4-C_5$ | 2.3 |
| $C_6$ | 41.6 |
| $C_7-C_8$ | 8.9 |
| $C_9$ | 36.3 |
| $C_{10}-C_{11}$ | 2.3 |
| $C_{12}$ | 6.2 |
| $C_{13}+$ | 2.5 |

What is claimed is:

1. A synthetic layered crystalline aluminosilicate comprising, when disregarding the presence of crystal water, the general formula expressed as moles of oxides ratios:

$(M_{2/n}O)_x:(SiO_2)_y:(Al_2O_3)_z$ where M represents one or more n-valent cations selected from the group consisting of sodium, potassium, and any other cation capable of replacing sodium or potassium by ion-exchange, where the ratio y/z is between 15 and 300, where the ratio x/z is determined from the criterion of electron neutrality between anions and cations, and in which the structural aluminum is tetrahedrally coordinated in the crystalline framework, and where the aluminosilicate has an X-ray diffraction pattern which exhibits a sharp diffraction maximum at about 3.45 Å and a further diffraction maximum at about 3.65 Å, the intensity of the further diffraction maximum being not more than 80% of the first diffraction maximum.

2. A synthetic layered crystalline aluminosilicate as claimed in claim 1 wherein the ratio y/z is between 20 and 150.

3. A synthetic layered crystalline aluminosilicate according to claim 1, wherein M is sodium and has an X-ray diffraction pattern as shown in Table 3.

4. A synthetic layered crystalline aluminosilicate as claimed in claim 3, wherein the ratio y/z is between 20 and 150.

5. A synthetic layered crystalline aluminosilicate as claimed in claim 1 wherein M is hydrogen.

6. A method for the preparation of a synthetic layered crystalline aluminosilicate which exhibits a sharp diffraction maximum at about 3.45 Å and a further diffraction maximum at about 3.65 Å, the intensity of the further diffraction maximum being not more than 80% of the first diffraction maximum, the method being carried out in the absence of an organic directing agent, comprising:

forming a synthesis mixture consisting essentially of at least one source of aluminum and at least one source of silicon, and having the composition expressed as moles of oxides ratios:

$SiO_2/Al_2O_3 = 5-500$
$M_{2/n}O/SiO_2 = 0.01-10$
$OH/SiO_2 = 0.1-5$
$H_2O/SiO_2 = 5-200$ wherein M is at least one n-valent cation selected from the group consisting of sodium, potassium and any other cation capable of replacing sodium or potassium by ion-exchange; and crystallizing the synthesis mixture under conditions such that crystallization of said synthetic crystalline aluminosilicate takes place with incorporation of tetrahedral aluminum in the silicate framework.

7. A method for the preparation of a synthetic layered crystalline aluminosilicate as claimed in claim 6 wherein the synthesis mixture has the composition expressed as moles of oxides ratios:

$SiO_2/Al_2O_3 = 10-300$
$M_{2/n}O/SiO_2 = 0.1-2$
$OH/SiO_2 = 0.2-4$
$H_2O/SiO_2 = 5-75$

8. A method for the preparation of a synthetic layered crystalline aluminosilicate as claimed in claim 6 wherein the synthesis mixture is held under autogeneous pressure at a temperature of 80°–270° C. for a period of 4 hours to 100 days.

9. A method for the preparation of a synthetic layered crystalline aluminosilicate as claimed in claim 6 wherein the synthesis mixture is held under autogeneous pressure at a temperature of 95°–160° C. for a period of 10 hours to 30 days.

10. A method for the preparation of a synthetic layered crystalline aluminosilicate as claimed in claim 6 wherein M is sodium or potassium.

11. A synthetic layered crystalline aluminosilicate comprising, when disregarding the presence of crystal water, the general formula expressed as moles of oxides ratios:

$$(M_{2/n}O)_x \cdot (SiO_2)_y \cdot (Al_2O_3)_z$$

where M represents an n-valent cation selected from the group consisting of hydrogen and ammonium cations and mixtures thereof, where the ratio y/z is between 15 and 300, where the ratio x/z is determined from the criterion of electron neutrality between anions and cations, and in which the structural aluminum is tetrahedrally coordinated in the crystalline framework, and wherein the aluminosilicate has an X-ray diffraction pattern which exhibits a strong first line at about 3.39 Å° and a further line at about 12.1 Å°, the intensity of the further line being not more than about 35% of the first line.

12. A synthetic layered crystalline aluminosilicate as claimed in claim 11, wherein the ratio y/z is between 20 and 150.

13. A method for the preparation of a synthetic layered crystalline aluminosilicate as claimed in claim 11, comprising ion-exchange of a synthetic layered aluminosilicate as claimed in claim 1 with a proton-acidic compound.

* * * * *